(12) United States Patent
Ohashi et al.

(10) Patent No.: US 6,611,425 B2
(45) Date of Patent: Aug. 26, 2003

(54) ELECTRONIC APPARATUS

(75) Inventors: Shigeo Ohashi, Tsuchiura (JP);
Noriyuki Ashiwake, Tsuchiura (JP);
Takashi Naganawa, Chiyoda (JP);
Makoto Kitano, Tsuchiura (JP);
Rintaro Minamitani, Tsukuba (JP);
Yoshihiro Kondo, Chiyoda (JP);
Tsuyoshi Nakagawa, Hadano (JP)

(73) Assignee: Hitachi, Ltd., Tokyo (JP)

( * ) Notice: Subject to any disclaimer, the term of this patent is extended or adjusted under 35 U.S.C. 154(b) by 25 days.

(21) Appl. No.: 09/934,594

(22) Filed: Aug. 23, 2001

(65) Prior Publication Data

US 2002/0105781 A1 Aug. 8, 2002

(30) Foreign Application Priority Data

Feb. 6, 2001 (JP) .......................................... 2001-028977

(51) Int. Cl.[7] .................................................. G06F 1/16
(52) U.S. Cl. ........................ 361/687; 361/689; 361/698; 361/709; 417/437
(58) Field of Search ................................. 361/687–689, 361/698–704, 709–714; 417/437–571

(56) References Cited

U.S. PATENT DOCUMENTS 3,963,380 A * 6/1976 Thomas, Jr. et al. ........ 417/322
5,646,824 A 7/1997 Ohashi et al.
5,757,615 A * 5/1998 Donahoe et al. ............ 361/687
5,764,483 A 6/1998 Ohashi et al.

FOREIGN PATENT DOCUMENTS

| JP | 06-266474 | 9/1994 |
|----|-----------|--------|
| JP | 07-142886 | 6/1995 |

* cited by examiner

*Primary Examiner*—Darren Schuberg
*Assistant Examiner*—Yean Hsi Chang
(74) *Attorney, Agent, or Firm*—Antonelli, Terry, Stout & Kraus, LLP

(57) ABSTRACT

An electronic apparatus has a water-cooling system suited for a construction having compact, thin design. In the electronic apparatus, a water-cooling jacket is thermally connected to a heat-generating element, a heat-dissipating pipe is thermally connected to a heat-dissipating metal sheet provided at a rear panel of a display case, and a cooling medium liquid is circulated between the water-cooling jacket and the heat-dissipating pipe by a liquid-moving device. A necessary and sufficient circulating flow rate and a necessary discharge pressure are determined by the relation between the upper limit temperature of the heat-generating element and the limit amount of heat dissipation from the surface of the housing. With this structure, heat occurring in the heat-generating element can be dissipated from the rear surface of the display case due to the necessary and sufficient liquid-circulating flow rate.

16 Claims, 4 Drawing Sheets

FIG. 2A  BASIC STRUCTURE
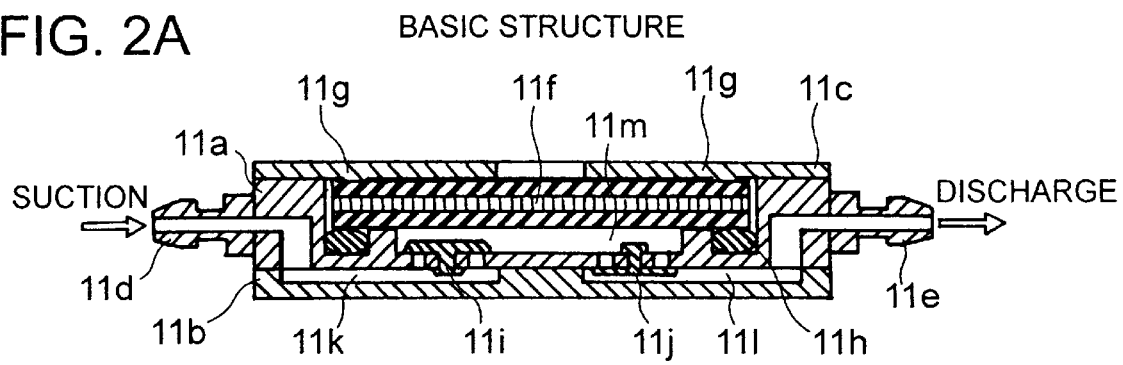
FIG. 2B  OPERATION PRINCIPLE : SUCTION
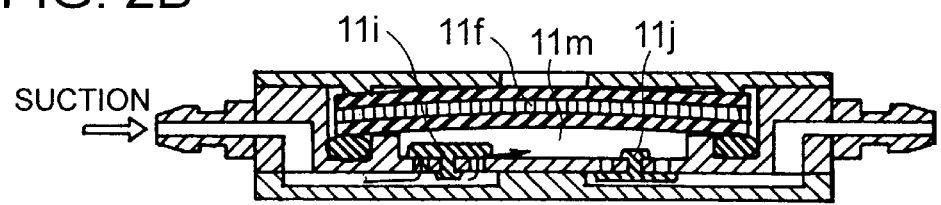
FIG. 2C  OPERATION PRINCIPLE : DISCHARGE
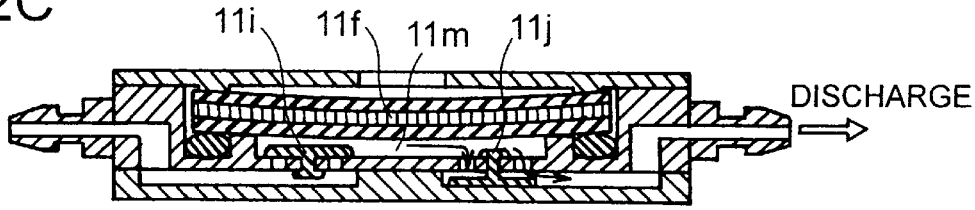

ELECTRONIC APPARATUS

BACKGROUND OF THE INVENTION

This invention relates to an electronic apparatus provided with a cooling device for circulating a cooling medium, such as water.

In one example of a conventional electronic apparatus, as disclosed in JP-A-6-266474, a printed circuit board, having a heat-generating element mounted thereon, is contained in a housing forming a shell of the electronic apparatus, and a display unit housing, having a display panel, such as a liquid-crystal panel, is pivotally mounted on this housing. A heat-receiving jacket is mounted on the heat-generating element in this electronic apparatus, and a cooling medium (such as water), that is sealed in this heat-receiving jacket, absorbs the heat generated by the heat-generating element is fed to a heat-dissipating pipe that is mounted on an inner surface of the display unit housing by a pump (liquid-moving device). The heat-receiving jacket, the heat-dissipating pipe and the pump are connected to one another by flexible tubes to jointly form a so-called water cooling-type cooling device.

JP-A-7-142886 discloses an example in which the housing of the water-cooled electronic apparatus, as disclosed in JP-A-6-266474, is made of metal.

In the above examples, the heat generated in the heat-generating element is transferred to the heat-receiving jacket, and the liquid, which absorbs and stores this heat, is moved from the heat-receiving jacket to the heat-dissipating pipe by the liquid-moving device, so that the heat is transferred from the heat-dissipating pipe to the housing and is radiated to the ambient atmosphere.

In large-size computers, semiconductor devices are cooled by a cooling medium, such as water, as is well known in the art.

SUMMARY OF THE INVENTION

In the above-described art techniques, the heat generated in the semiconductor device is merely transferred to the display side by a cooling device of the water cooling-type. Namely, according to research by the inventors of the present invention, the above-described techniques do not take into consideration the possibility of forming the cooling medium-circulating pump so as to produce a thin design. In other words, a pump for circulating water is merely provided, and the cooling medium liquid is circulated at a typical liquid-moving rate and operating pressure, which are larger than required, thereby effecting excessive cooling. Therefore, the pump is large in size, and so it has been difficult with such an approach to form a portable electronic apparatus having a thin design.

It is therefore an object of this invention to provide an electronic apparatus in which the size and operating condition of a liquid-moving device are optimized by determining those liquid circulating conditions which are necessary and sufficient for an increased amount of heat occurring in a heat-generating element, as a result of an improved processing performance of the electronic apparatus, thereby providing an electronic apparatus that is suited for a compact and thin design.

According to a first aspect of the present invention, there is provided an electronic apparatus that has a first housing having a semi-conductor device mounted therein; a second housing having a display device disposed therein, which second housing is pivotally supported on the first housing; a heat-receiving member held in thermal contact with the semi-conductor device; a heat-dissipating member held in thermal contact with an inner surface of the second housing; liquid-moving means located in the first housing so as to move a liquid medium between the heat-dissipating member and the heat-receiving member; and a tube interconnecting the heat-receiving member, the heat-dissipating member and the liquid-moving means, the liquid-moving means being made to have a thickness smaller than the thickness of the first housing.

According to a second aspect of the present invention, there is provided an electronic apparatus that has a first housing having a semi-conductor device mounted therein; a second housing having a display device disposed therein, which second housing is pivotally supported on the first housing; a heat-receiving member held in thermal contact with the semi-conductor device; a heat-dissipating member held in thermal contact with an inner surface of the second housing; liquid-moving means located in the first housing so as to move a liquid medium between the heat-dissipating member and the heat-receiving member; and a tube interconnecting the heat-receiving member, the heat-dissipating member and the liquid-moving means, the second housing being made to have a surface temperature, as a value of temperature rise, that is maintained at not more than 25° C. above the ambient temperature.

According to a third aspect of the present invention, there is provided an electronic apparatus that has a first housing, having a semi-conductor device mounted therein; a second housing having a display device disposed therein, which second housing is pivotally supported on the first housing; a heat-receiving member held in thermal contact with the semi-conductor device; a heat-dissipating member held in thermal contact with an inner surface of the second housing; and a tube connected to liquid-moving means for moving a liquid medium between the heat-dissipating member and the heat-receiving member, the liquid-moving means being operated to provide a liquid-circulating rate not less than 120 $\mu$L/SEC.

The liquid-circulating flow rate brought about by the liquid-moving means is preferably not more than 1200 $\mu$L/SEC.

The cooling medium liquid may be circulated at a flow rate not less than a value Q defined by the following formula, in order to cool the heat-receiving member down to a temperature TWJ:

$$Q = 6 \cdot A \cdot QC / (12 \cdot A \cdot (TWJ - TA) - QC) / (\rho \cdot CP)$$

where $\rho$ and CP represent the density and specific heat of the cooling medium liquid, respectively, QC represents the amount of heat occurring in a CPU (semi-conductor device), TA represents the ambient temperature, and A represents the area of a heat-dissipating metal sheet.

The height of the liquid-moving means may be not more than 30 MM.

The liquid-moving means may have a flattened shape, and may be arranged to be flat in the direction of the thickness of the first housing.

The inner diameter of the tube, which interconnects the heat-receiving member, the heat-dissipating member and the liquid-moving means, may be larger than the inner diameter of the heat-dissipating member.

The liquid discharge pressure of the liquid-moving means may be not less than about $1.7 \times 10^4$ Pa.

BRIEF DESCRIPTION OF THE DRAWINGS

FIGS. 2A to 2C are vertical cross-sectional views of a piezoelectric element-type pump, which views show the basic structure and respective operation states of the piezoelectric element-type pump.

DESCRIPTION OF THE PREFERRED EMBODIMENT

Portable lap-top personal computers have been extensively used in various ways for personal computing, as advances in IT (information technology) have been developed; therefore, there has been a demand to provide a highly-portable, thin and lightweight housing for such a personal computer. In this regard, the portable lap-top personal computer now is required to achieve a performance, almost corresponding to that of a desk-top personal computer, with a thin design and compatibility with an A4 paper size. Therefore, it has become essential to efficiently cool the CPU which generates much heat within the thin housing of such a portable computer.

In a portable lap-top personal computer, it is necessary that the temperature of the housing should not become so high that the keyboard and palm rest area (located at the front side of the keyboard), which are touched by the hands of an operator, and the bottom of the housing, which contacts the lap of the operator when it is used, are so warm as to make the operator feel uncomfortable. Therefore, it is required to provide a cooling system that is capable of efficiently dissipating the heat, which is generated in the CPU, through the entire area of the surface of the housing, and it is also required to achieve a silent operation by eliminating the use of a cooling fan.

In lap-top personal computers, the current CPU, having a heat value in the 15 W class, is cooled by a cooling fan, or a combination of a heat pipe having a cooling medium sealed therein and a heat-sink. In the cooling provided for a heat value in the 30 W class, a large-size fan (70 mm×70 mm), or a plurality of heat pipes and a large-size heat-sink, are needed. In the cooling structures of the forced air cooling-type, it is necessary to address the noise problem and to provide a suitable mounting area.

In recent years, a more mobile design has been developed in a portable electronic apparatus; and, therefore, it has been necessary to provide a more lightweight-and-compact design and a higher processing speed. In the course of satisfying these requirements, the amount of heat generated in a central processing unit (hereinafter referred to as a "CPU") for processing data becomes larger, and the heat amount is believed to correspond to that of a CPU of the 30 W class. The current forced air-cooling system can not suitably cool such a CPU of the 30 W class; and, therefore, a water cooling-type cooling system, as disclosed in the background of the invention, has been found to be more effective. However, the thickness of the portable electronic apparatus is determined by the size of the pump used for moving the cooling water, and the present invention has been achieved as a result of extensive research in an attempt to reduce the thickness of the pump as much as possible.

A preferred embodiment of the present invention will be described below with reference to FIG. 1.

Figure 1:
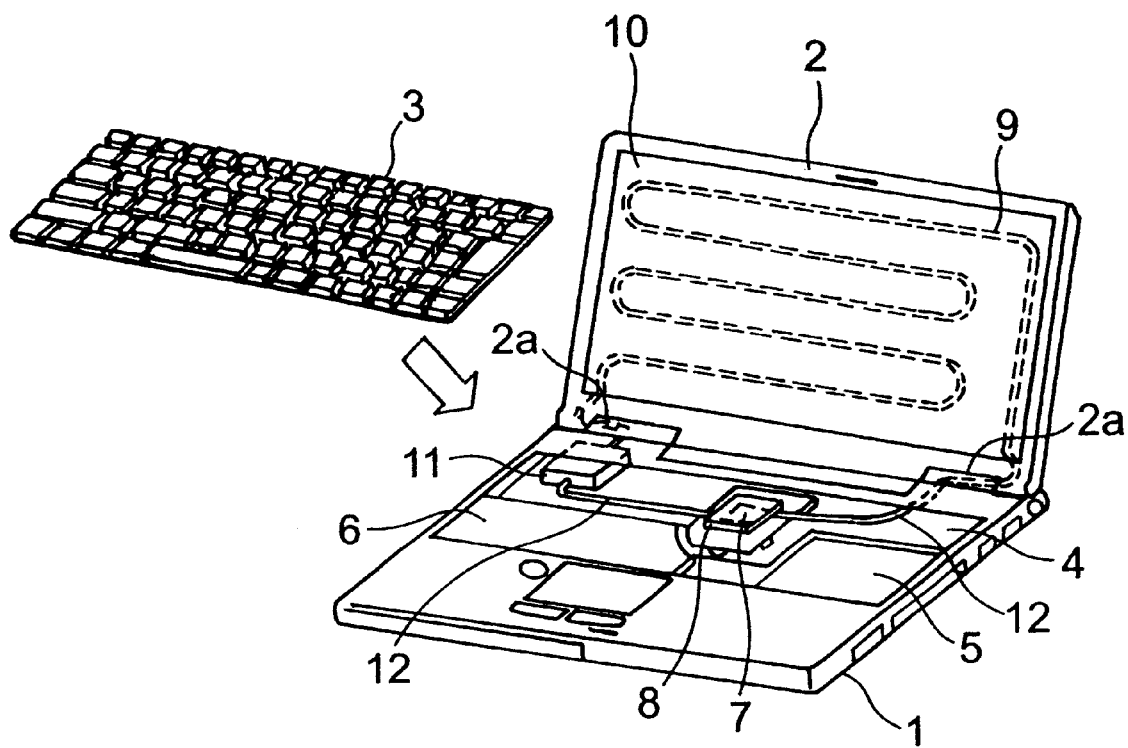
FIG. 1 is an exploded perspective view showing a preferred embodiment of an electronic apparatus in accordance with the present invention.

FIG. 1 is a perspective view of an electronic apparatus embodying the present invention.

In FIG. 1, reference numeral 1 denotes the body of a main case (first housing) of the electronic apparatus, and reference numeral 2 denotes a display case (second housing) provided with a display device. A keyboard 3 is mounted on the main case 1. Reference numeral 4 denotes a printed circuit board on which a plurality of elements (devices) are mounted. Reference numeral 5 denotes a hard disk drive, reference numeral 6 denotes an auxiliary storage device (for example, a floppy disk drive, a CD drive and so on), and these elements are located in the main case 1. An element 7, such as a CPU (central processing unit), in which a particularly large amount of heat is generated, is mounted on the printed circuit board 4, and this element 7 is hereinbelow referred to as a "CPU". A water-cooling jacket (heat-receiving member) 8 is provided in contact with the CPU 7, which is connected to the water-cooling jacket 8 through a flexible, thermally-conductive member (comprising, for example, Si rubber containing a thermally conductive filler, such as aluminum oxide). A heat-dissipating pipe (heat-dissipating member) 9 is provided on a rear panel (case inner surface) of the display case 2. A heat-dissipating metal sheet 10 is also provided on the rear panel (case inner surface) of the display case 2.

The display case 2 itself may be made of a metal (such as an aluminum alloy and a magnesium alloy), in which case the provision of the heat-dissipating metal sheet 10 can be omitted, and the heat-dissipating pipe 9 can be connected directly to the display case 2.

A pump (liquid-moving device) 11, serving as a cooling medium-transporting means for cooling the semiconductor device, is mounted within the main case 1. The height of this pump 11 is limited to not more than 10 mm, so that it can be located in the portable electronic apparatus. As a pump capable of satisfying this limitation, a piezoelectric element-type pump may be adopted, which is a type of pump used as a liquid circulating pump for medical purposes. The water-cooling jacket 8, the heat-dissipating pipe 9 and the pump 11 are connected to one another through flexible tubes 12, so as to form one hermetically sealed space, and a cooling medium liquid (such as water and an anti-freeze liquid) is hermetically sealed in this space, whereby this cooling medium liquid can be circulated in the space by the pump 11. These constituent parts will be referred to hereinafter as "a cooling device", as a whole.

This cooling device needs to have a high degree of air tightness so that the cooling medium liquid may be hermetically sealed in this cooling device. Therefore, it is preferred to interconnect the constituent parts to each other primarily by copper pipes, without using the flexible tubes 12, and to solder these copper pipes directly to each of the heat-receiving jacket 8 and the pump 11. However, in order to allow the heat to be dissipated from a display case 2 having a large heat-dissipation area, the connecting parts provided between the main case 1 and the display case 2 must be provided in the form of the flexible tubes 12. Namely, since the display case 2 is pivotally moved relative to the main case 1 each time the portable electronic apparatus is opened and closed, there is a need to connect the parts through use of the flexible tubes 12.

However, in a case where the flexible tubes 12 are repeatedly bent into a U-shape at the same portion over a period of several years, there is a concern that the bent portions will be subjected to cracking due to fatigue and hardening of the bent portions.

Thus, in accordance with the present invention, each of the flexible tubes 12 which perform this connecting function is located within a respective one of the hinges 2a and extends in the direction of the axis of the hinges. With this arrangement, each time the display case 2 is opened and closed, the flexible tubes 12 are subjected to twisting, which differs from the bending into a U-shape, whereby it becomes possible to prevent a single portion of the flexible tube 12 from being bent repeatedly. Thus, the concentration of fatigue which is apt to occur in the case of the repeated bending of the flexible tubes into a U-shape is prevented from occurring, that is, the reliability when using the flexible tubes 12 is enhanced.

Details of the piezoelectric element-type pump 11 will be described with reference to FIGS. 2A to 2C, which are vertical cross-sectional views of the pump 11.

As seen in FIG. 2A, the pump 11 has a casing 11a, a bottom cover 11b which closes the bottom of the casing 11a, and a top cover 11c which closes the top of the casing 11a. The casing 11a and the bottom and top covers 11b and 11c jointly form a shell of the pump 11. At respective ends of the casing 11a, there are provided a suction port 11d for drawing in the liquid and a discharge port 11e for discharging the liquid. An oscillator 11f is mounted within the casing 11a, which oscillator 11f is sandwiched between covering members made of silicone rubber, and the oscillator 11f is held at opposite ends thereof between a pair of projections 11g (formed at opposite ends of an inner surface of the top cover 11c) and an O-ring 11h. Therefore, the oscillator 11f is fixed to the casing 11a at the opposite ends thereof. Although not shown in the drawings, thin piezoelectric elements, each having an electrode, are bonded to opposite sides (faces) of this oscillator 11f, respectively. When a voltage is applied to the piezoelectric elements, one side of the oscillator 11f is expanded while the other side thereof is contracted; and, therefore, upon application of an AC voltage to the piezoelectric elements, the oscillator 11f oscillates at the frequency of the AC voltage. Reference numeral 11i denotes a first valve, and reference numeral 11j denotes a second valve. Reference numeral 11k denotes a suction passage, and reference numeral 11l denotes a discharge passage. Reference numeral 11m denotes a pressure chamber provided below the oscillator 11f.

FIG. 2A shows an inoperative condition (stop state) of the pump 11. When the oscillator 11f bulges to have a convex shape as shown in FIG. 2B, the pressure within the pressure chamber 11m is reduced, so that the valve 11i is opened, and liquid is drawn into the pump 11 through the suction port 11d. On the other hand, when the oscillator 11f bulges to have a concave shape, as shown in FIG. 2C, the pressure within the pressure chamber 11m increases, so that the second valve 11j is opened, and the liquid is discharged from the pump 11 through the discharge port 11e.

Next, the operation of the cooling device will be described.

Heat generated in the CPU 7 is transferred to the cooling medium liquid flowing in the water-cooling jacket 8, and while the cooling medium liquid flows through the heat-dissipating pipe 9, the heat is radiated to the ambient atmosphere from the heat-dissipating metal sheet 10 through the outer surface of the display case 2. The cooling medium liquid, that is lowered in temperature by this operation, is again fed to the cooling-water jacket 8 by the pump 11. This operation is repeated, so that the CPU 7 is cooled.

The radiation area of the rear surface of the display case 2 is about 90000 mm$^2$ in the average portable electronic apparatus. The type of heat dissipation achieved in this portable electronic apparatus, that is provided with a cooling device using a liquid medium is natural convection and heat radiation both occurring from the rear surface of the display case 2. The thermal resistance relating to this heat dissipation is determined only by the area of the display case and is about 0.8° C./W.

On the other hand, the portable electronic apparatus is designed so that the upper limit of its temperature may be about 60° C. so as not to cause the operator to feel uncomfortable when he touches the surface of the display case. In this case, the maximum temperature of the outside air is assumed to be 35°; and, therefore, the temperature difference, which becomes the temperature rise value, is 25° C. Therefore, when the temperature rise value at the rear surface of the display case is 25° C. uniformly over the entire area thereof, this establishes a limit for the amount of dissipation of heat from the rear surface of the display case, and the limit of the amount of heat dissipation is about 30 W. On the other hand, the CPU 7 is designed so that the upper limit of its temperature typically may be 95° C., (that is, when this temperature exceeds 95° C., the CPU may be damaged), and so the cooling medium-circulating rate required for the cooling device is determined by the relation between the limit heat-dissipation amount of 30 W and the upper limit temperature of the CPU.

Figure 3:
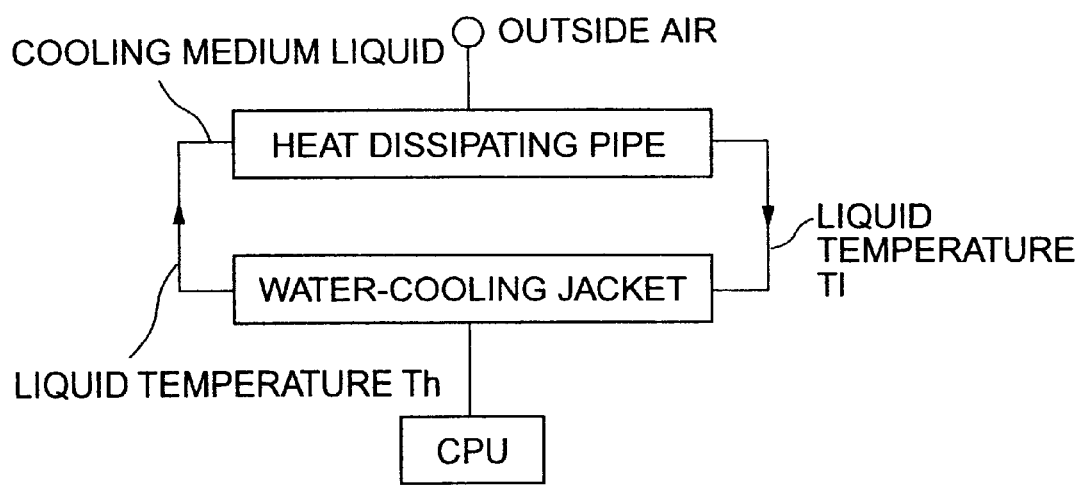
FIG. 3 is a block diagram schematically showing the arrangement of a heat-dissipating cooling path in the apparatus of FIG. 1.

FIG. 3 schematically shows the heat-dissipation path of the cooling device, and the amount of liquid-circulating in this path will be described with reference to this figure. The following description is based on the assumption that the temperature of the outside air is 35° C. (which is the upper limit of the outside air temperature in the environment of use).

In FIG. 3, even in cases where the thermal resistance R1 between the CPU and the water-cooling jacket is 0° C., which is ideal, the upper limit temperature of the cooling medium liquid is 95° C., which is the same as that of the CPU. On the other hand, when heat is dissipated from the heat-dissipating pipe in an ideal manner, the temperature of the cooling medium liquid drops to 35° C., which is the same as the outside air temperature. Namely, the maximum value of the temperature rise (liquid temperature TH liquid temperature TL) of the cooling medium liquid is 60° C. Therefore, in a case where water is used as the cooling medium liquid, the circulating flow rate becomes 120 μL/sec which is determined from the density of 998 KG/M$^3$ and specific heat of 4180 J/KGK as to the water, and this circulating flow rate becomes the lower limit.

On the other hand, in the case where a sufficient circulating flow rate is obtained (in which case it is assumed that the temperature rise defined by (liquid temperature TH liquid temperature TL) of the cooling medium liquid is substantially 0° C.), the maximum value of the sum of both the temperature difference between the CPU and the water-cooling jacket and the temperature difference between the heat-dissipating pipe and the outside air temperature becomes 60° C., and 10% of the maximum value (60° C.) of this temperature difference sum is included as manufacturing and design errors.

Namely, in a case where the temperature rise (liquid temperature TH liquid temperature TL) of the cooling medium liquid is 6° C., the circulating flow rate is 1200 μL/sec. In other words, a sufficient circulating flow rate becomes not more than 1200 μL/sec; and, even when the cooling medium liquid is circulated at a flow rate larger than this value, the cooling performance thereof is kept almost saturated. On the other hand, circulating the cooling medium liquid at a flow rate that is larger than this value merely requires the pump to have an excessively large capability, (that is, an increased size and an increased consumption of electricity), and this is worthless.

Figure 4:
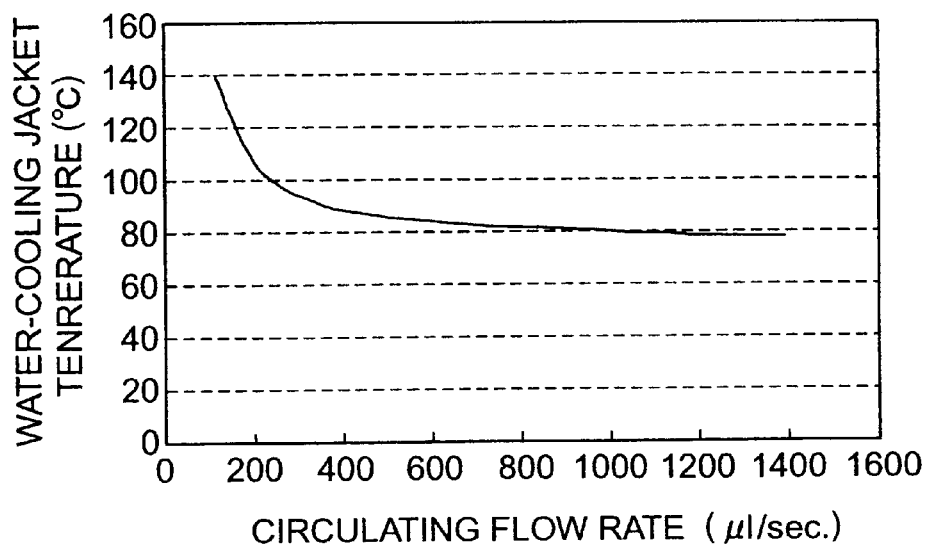
FIG. 4 is a graph showing the relation between the liquid-circulating flow rate and the temperature of the cooling device of FIG. 1.

This also can be appreciated from a consideration of the relation between the circulating flow rate and the temperature of the water-cooling jacket, as shown in FIG. 4. FIG. 4 shows the relation between the circulating flow rate and the temperature of the water-cooling jacket in the case where the amount of heat generated in the CPU is 30 W, the outside air temperature is 35° C., the heat-dissipating pipe has a length of 1.5 M and a flow passage area (cross-section) of 3 mm×3 mm, and eight flow passages, each having a length of 30 mm, are located in the water-cooling jacket.

In FIG. 4, when the circulating flow rate is in the range of not less than 1200 µL/sec, the temperature of the water-cooling jacket scarcely varies in spite of an increase in the flow rate.

Between the temperature TWJ of the water-cooling jacket and the circulating flow rate Q, the following relations are approximately established:

$$QC=((TH+TL)/2-TA)\cdot 12\cdot A \quad (1);$$

$$QC=\rho \cdot CP \cdot Q \cdot (TH-TL) \quad (2);$$

and $$TWJ=TH \quad (3)$$

wherein the density and specific heat of the cooling medium liquid are represented by $\rho$ and CP, respectively, the amount of heat occurring in the CPU is represented by QC, the outside air temperature is represented by TA, and the area of the heat-dissipating metal sheet is represented by A.

Therefore, the following formula is obtained:

$$Q=6\cdot A \cdot QC/(12\cdot A \cdot (TWJ-TA)-QC)/(\rho \cdot CP) \quad (4)$$

Namely, for cooling the water-cooling jacket to the predetermined temperature TWJ, it is necessary to circulate the cooling medium liquid at a flow rate larger than the flow rate expressed by formula (4). Incidentally, since the density and specific heat of the cooling medium liquid vary in dependence on the liquid temperature, the values of these parameters are obtained at the liquid temperature at the time of the operation.

Figure 5:
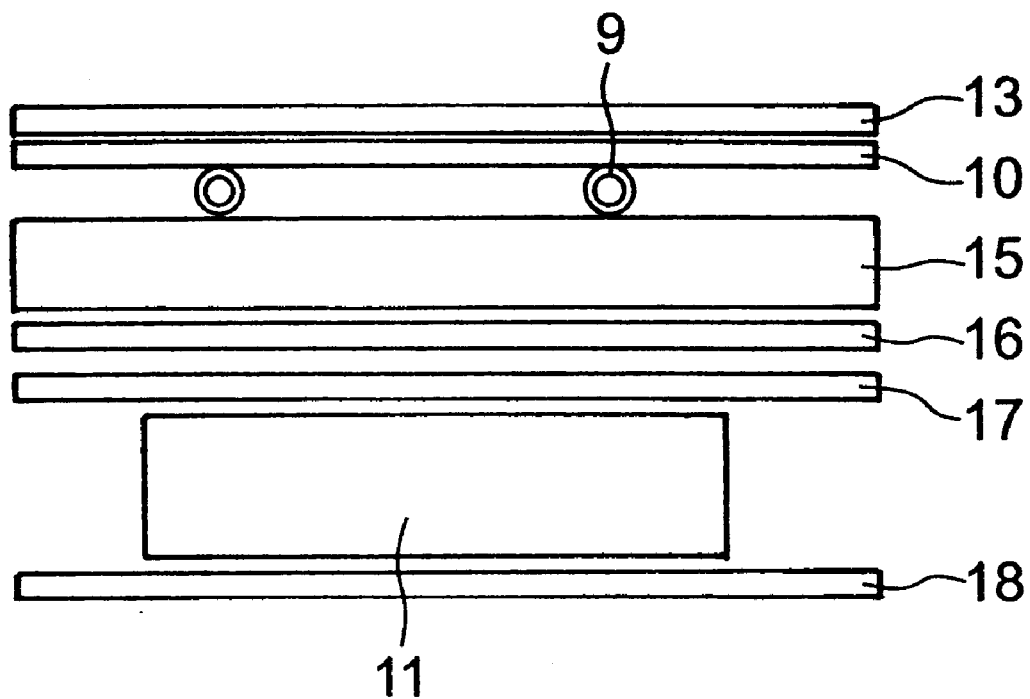
FIG. 5 is a diagram showing a detailed cross-sectional view of a portion of the apparatus of FIG. 1.

FIG. 5 is a vertical cross-sectional view of a portion of the electronic apparatus (in the closed state of the display case) embodying the invention.

Generally, it is preferred that the thickness of the housing (in the closed state of the display case) of the portable electronic apparatus be not larger than 50 mm from the point of view of easy portability and the handling ability needed when it is carried. As shown in FIG. 5, with respect to the dimensions in the direction of the thickness of the apparatus, the sum of the thickness of each of a display case front panel 16 formed of a sheet with a thickness of 1 to 2 mm, a display case rear panel 13, a body case upper panel 17 and a body case lower panel 18 is about 3 mm; the diameter of the heat-dissipating pipe 9 is about 3 mm; the thickness of the heat-dissipating metal sheet 10 is 0.2 to 0.5 mm; and the thickness of a display panel 15 is 5 to 10 mm. These thickness values can not be reduced from the viewpoint of strength and safety. Therefore, the total of the thickness of these members becomes about 15 mm, and so it is necessary that the thickness of the body case 1, including the thickness of the pump 11, not be more than 30 mm, at the most.

Therefore, if the pump 11 is located at any position within the body case 1, a space corresponding to at least the above dimension of 15 mm is occupied in the direction of the thickness of the apparatus. Thus, the maximum height of the pump 11 itself needs to be not more than 30 mm.

A feature of the present invention resides in the fact that a piezoelectric element-type pump (also called "diaphragm-type pump") is used in the portable electronic apparatus. In the piezoelectric element-type pump, it is possible to reduce the thickness thereof, so that this pump has been generally used for medical purposes. When the volume-varying stroke of this piezoelectric element-type pump is kept constant, the variable volume can be increased by increasing the dimension of the pump in the direction of the plane of the pump, so that the circulating flow rate of the cooling medium liquid can be increased.

Therefore, in the portable electronic apparatus, the pump needs to achieves its size by an increase in the direction of the plane thereof rather than in the direction of the height thereof; that is, the shape of the pump needs to be flattened in a direction perpendicular to the direction of the thickness of the housing. On the other hand, in the case of a centrifugal pump, the flow rate can be effectively increased by increasing the size in a radial direction rather than in the direction of the height (because the flow rate is proportional to the first power of the height-wise dimension, but is proportional to the second power of the radial dimension). Namely, similar to the case of a piezoelectric element-type pump, the centrifugal pump needs to have such a shape and a type of mounting as to be flattened in the direction perpendicular to the direction of the thickness of the housing.

The heat-dissipating pipe 9 is thermally connected to the heat-dissipating metal sheet 10 that is held in contact with the inner surface of the display case rear panel 13. The display case rear panel 13 may be made of a metal, such as an aluminum alloy or a magnesium alloy; and, in this case, the display case itself serves as a heat-dissipating sheet, and therefore, the provision of the heat-dissipating sheet 10 becomes unnecessary. Preferably, the heat-dissipating pipe 9 extends in a meandering manner generally uniformly over the display case panel so as to dissipate heat from the heat-dissipating sheet 10 substantially uniformly over the entire surface thereof, as shown in FIG. 1.

For example, in a typical portable electronic apparatus (having a width of about 300 mm), the length of the passage of the heat-dissipating pipe 9 becomes 1 to 1.5 m. Namely, most of the circulating passage is occupied by the heat-dissipating pipe 9. Besides, the heat-dissipating pipe 9 is provided between the display panel 15 and the display case rear panel 13, and, therefore, it is preferred that the diameter of the heat-dissipating pipe 9 be as small as possible. Thus, most of the flow resistance caused in the circulating passage comes to occur in the heat-dissipating pipe portion.

On the other hand, it is preferred that the flow resistance be as small as possible in view of the matching of both the operating flow rate brought about by the pump 11 and the flow resistance with the pump characteristics, and it is preferred that the diameter of the piping (flexible tubes 12) within the case 1 be larger than the diameter of the heat-dissipating pipe 9. Even in a case where the length of the heat-dissipating pipe 9 is made to be larger than the above-mentioned length of 1 to 1.5 m, the heat-dissipating effect thereof scarcely varies, because the heat-diffusing effect occurs in the heat-dissipating metal sheet 10; and, therefore, in order to reduce the flow resistance, the length of the heat-dissipating pipe need not be larger than the above-mentioned length.

In the above case, when setting the inner diameter and length of the heat-dissipating pipe to be 1.5 mm and 1.5 m, respectively, while setting the inner diameter and length of the tubes connecting the water-cooling jacket, the pump and the heat-dissipating pipe together to be 2.0 mm and 0.5 mm, respectively, the flow resistance (occurring when water is used as the cooling medium liquid) at the maximum circulating rate becomes about $1.7 \times 10^4$ PA (the flow resistance within the water-cooling jacket and at the connecting portions being able to be disregarded in comparison with that in the heat-dissipating pipe), so that the pump is required to have a capability of discharging at a pressure not less than $1.7 \times 10^4$ Pa.

In a case of using a non-freezing solution as the cooling medium liquid, a larger pressure is required, in that the non-freezing solution usually has a viscosity coefficient that is larger than that of water. When expressing the density and viscosity coefficient of the non-freezing solution as $\rho$ and $\mu$, respectively, while expressing the inner diameter and length of the heat-dissipating pipe as d and L, respectively, and expressing the flow rate as Q, the flow resistance $\Delta P$ is expressed by the following formula:

$$\Delta P = 128 \, \mu L Q / \pi d^4) \tag{5}$$

Since the density and viscosity coefficient of the non-freezing solution vary with the liquid temperature, the values thereof at a liquid temperature at the time of the operation of the pump are used. As regards the pump, a pump having the capability of making the liquid flow at a predetermined flow rate under the flow resistance set in the above formula (5) is employed, that is, a pump which can bring about a discharge pressure larger than the flow resistance set in the above formula (5), so as to achieve the predetermined flow rate. On the other hand, it is preferred that the amount of hermetically sealed circulating liquid is not less than 3 cc, and 6 cc is sufficient even in a case of taking a liquid reservoir (for coping with liquid withdrawal) into account.

In the above embodiment, although the heat-dissipating sheet connected to the heat-dissipating pipe is provided in the display case 2, the heat-dissipating sheet may be alternatively mounted on the inner surface of the main case 1 so as to dissipate heat from the surface of the main case 1. In another modified form of the invention, the dissipation of heat from the surface of the display case and the radiation of heat from the surface of the main case 1 may be used in combination.

As described above, in accordance with the present invention, the heat-generating element is thermally connected to the water-cooling jacket. The heat-dissipating pipe is thermally connected to the heat-dissipating sheet provided at the rear panel of the display case. The cooling medium liquid is circulated between the water-cooling jacket and the heat-dissipating pipe by the liquid-moving device. The heat-dissipating pipe is arranged on the heat-dissipating sheet generally uniformly over the entire area thereof so as to dissipate heat from the heat-dissipating sheet generally uniformly over the entire surface thereof. On the other hand, based on the limit amount of dissipation of heat from the surface of the housing, the necessary and sufficient circulating flow rate and the necessary discharge pressure are determined by the relation between the upper limit temperature of the heat-generating element and the limit heat-dissipation amount.

Therefore, the heat generated in the heat-generating element is transferred to the cooling medium liquid flowing in the water-cooling jacket, and while this liquid flows through the heat-dissipating pipe, the heat is dissipated through the surface of the display case to the outside air from the heating sheet located at the rear panel of the display case. The cooling medium liquid is thus lowered in temperature and is again fed to the water-cooling jacket by the liquid-moving device. At this time, the amount of heat dissipated from the rear surface of the display case is directly determined when the surface temperature and area of the heat-dissipating surface are set. Therefore, the limit of heat-dissipation amount is determined and the necessary liquid-circulating flow rate is set by the relation between this limit of the heat-dissipation amount and the upper limit temperature of the heat-generating element.

The maximum temperature difference between the maximum temperature and minimum temperature of the circulating liquid in the passage is the temperature difference between the upper limit temperature of the heat-generating element and the outside air temperature. The temperature difference (temperature rise) of the circulating liquid needs to be kept in a range not more than this maximum temperature difference, and this represents the lower limit of the necessary circulating flow rate. On the other hand, when the circulating flow rate is increased, the temperature rise of the circulating liquid is reduced. However, because there exists both a temperature difference between the heat-generating element and the water-cooling jacket and another temperature difference between the heat-dissipating pipe and the outside air, it is worthless to reduce the temperature rise of the circulating liquid to a level lower than the necessary value, whereby the upper limit of the circulating flow rate is determined.

Since the heat-dissipating pipe is arranged on the heat-dissipating sheet generally uniformly over the entire area thereof, most of the overall circulating passage is occupied by the heat-dissipating pipe. Therefore, the overall flow resistance is determined mostly by the flow resistance of the heat-dissipating pipe, and the pressure necessary for the liquid-moving device is determined.

As described above, in the electronic apparatus of the present invention in which the cooling medium liquid is circulated between the heat-generating element and the heat-dissipating pipe provided at the rear panel of the display case, heat occurring in the heating-generating element can be dissipated from the rear surface of the display case by establishing a necessary and sufficient liquid-circulating flow rate.

According to the present invention, an electronic apparatus can be provided in which, by establishing necessary and sufficient liquid-circulating conditions for an increased amount of heat that is present in the heat-generating element as a result of the improved processing performance of the electronic apparatus, the size and operating conditions of the liquid-moving device are optimized, thereby providing an electronic apparatus suited for a compact, thin design.

What is claimed is:

1. An electronic apparatus comprising: a first housing having a semi-conductor device mounted therein; a second housing having a display device located therein, which second housing is pivotally supported on said first housing; a heat-receiving member held in thermal contact with said semi-conductor device; a heat-dissipating member held in thermal contact with an inner surface of said second housing; liquid-moving means located in said first housing to move a liquid medium between said heat-dissipating member and said heat-receiving member; and a tube connecting said heat-receiving member, said heat-dissipating member and said liquid-moving means to each other, said liquid-moving means producing a liquid-circulating flow rate not less than 120 $\mu$L/sec.

2. An electronic apparatus according to claim 1, wherein the liquid-circulating rate brought about by said liquid-moving means is not more than 1200 $\mu$L/sec.

3. An electronic apparatus according to claim 2, wherein a liquid discharge pressure of said liquid-moving means is not less than about $1.7 \times 10^4$ Pa.

4. An electronic apparatus according to claim 1, wherein the liquid medium is circulated at a circulating flow rate not less than a value Q expressed by the following formula, in order to cool said heat-receiving member to a temperature TWJ:

$$Q = 6 \cdot A \cdot QC / (12 \cdot A \cdot (TWJ - TA) - QC) / (\rho \cdot CP)$$

in which $\rho$ and CP denote the density and specific heat of the liquid medium, respectively, QC denotes the amount of heat generated by a semi-conductor device, TA denotes an outside air temperature, and A denotes the area of a heat-dissipating metal sheet.

5. An electronic apparatus according to claim 4, wherein a liquid discharge pressure of said liquid-moving means is not less than about $1.7 \times 10^4$ Pa.

6. An electronic apparatus according to claim 1, wherein said liquid-moving means has a height of not more than 30 mm.

7. An electronic apparatus according to claim 6, wherein a liquid discharge pressure of said liquid-moving means is not less than about $1.7 \times 10^4$ Pa.

8. An electronic apparatus according to claim 1, wherein said liquid-moving means has a flattened shape and is arranged to be flattened in the direction of the thickness of said first housing.

9. An electronic apparatus according to claim 8, wherein a liquid discharge pressure of said liquid-moving means is not less than about $1.7 \times 10^4$ Pa.

10. An electronic apparatus according to claim 1, wherein said tube connecting said heat-receiving member, said heat-dissipating member and said liquid-moving means to each other has an inner diameter larger than the inner diameter of said heat-dissipating member.

11. An electronic apparatus according to claim 10, wherein a liquid discharge pressure of said liquid-moving means is not less than about $1.7 \times 10^4$ Pa.

12. An electronic apparatus according to claim 1, wherein a liquid discharge pressure of said liquid-moving means is not less than about $1.7 \times 10^4$ Pa.

13. An electronic apparatus according to claim 1, wherein said liquid-moving means is a piezoelectric element-type pump.

14. An electronic apparatus according to claim 1, wherein said liquid-moving means is a centrifugal pump.

15. An electronic apparatus according to claim 3, wherein said apparatus is a notebook-type personal computer.

16. An electronic apparatus according to claim 1, wherein said second housing is pivotally supported on said first housing by hinges, and said tube extends through said hinges along the axis of rotation thereof between said first and second housings.

* * * * *